(12) United States Patent
Hirasaka et al.

(10) Patent No.: US 7,079,358 B2
(45) Date of Patent: Jul. 18, 2006

(54) DISK DRIVE ACTUATOR FOR DISSIPATING HEAT THEREFROM

(75) Inventors: Yoshihiro Hirasaka, Kanagawa (JP); Mutsuo Ohta, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 212 days.

(21) Appl. No.: 10/692,992

(22) Filed: Oct. 24, 2003

(65) Prior Publication Data

US 2004/0114278 A1 Jun. 17, 2004

(30) Foreign Application Priority Data

Oct. 25, 2002 (JP) ............... 2002-311350

(51) Int. Cl.
*G11B 5/54* (2006.01)
(52) U.S. Cl. ................. 360/265.8; 360/264.7
(58) Field of Classification Search .............. 360/264.7
See application file for complete search history.

(56) References Cited

U.S. PATENT DOCUMENTS

| 4,775,908 | A | * | 10/1988 | Ycas | 360/264.9 |
| 5,247,410 | A | * | 9/1993 | Ebihara et al. | 360/264.9 |
| 5,656,877 | A | * | 8/1997 | Loubier | 310/13 |
| 5,862,019 | A | * | 1/1999 | Larson | 360/265.8 |
| 6,078,477 | A | * | 6/2000 | Adams et al. | 360/265.8 |
| 6,181,530 | B1 | * | 1/2001 | Ratliff et al. | 360/265.8 |
| 6,252,746 | B1 | * | 6/2001 | Cho | 360/265.8 |
| 6,600,633 | B1 | * | 7/2003 | Macpherson et al. | 360/265.8 |
| 6,787,941 | B1 | * | 9/2004 | Takashima | 310/12 |
| 6,847,506 | B1 | * | 1/2005 | Lin et al. | 360/265.8 |
| 6,937,444 | B1 | * | 8/2005 | Oveyssi | 360/265.8 |
| 2002/0054458 | A1 | * | 5/2002 | Subrahmanyan | 360/264.7 |

FOREIGN PATENT DOCUMENTS

| JP | 2-73574 A | * | 3/1990 |
| JP | 2-168474 A | * | 6/1990 |
| JP | 2002-008331 | | 1/2002 |

* cited by examiner

*Primary Examiner*—Jefferson Evans
(74) *Attorney, Agent, or Firm*—Bracewell & Giuliani LLP (57) ABSTRACT

A disk drive has an actuator supported for turning, and supporting magnetic heads for reading and writing data from and to a recording disk and a voice coil for driving the actuator. Plates are disposed near the voice coil so as to cover part of the voice coil. A hard disk drive capable of detachably combining with a PC card is formed by assembling separate component parts including a functional unit including a disk, a base plate holding the functional unit, a frame bumper disposed in a middle part of the assembly and serving as a shock-absorbing member, a card assembly provided with a connector to be connected to the slot of a PC card, and a top cover covering the functional unit held on the base plate. The frame bumper receives lateral shocks that act on the side surfaces of the hard disk drive.

12 Claims, 6 Drawing Sheets

DISK DRIVE ACTUATOR FOR DISSIPATING HEAT THEREFROM

PRIORITY PATENT APPLICATION

This application claims priority to Japanese Patent Application No. JP2002-311350 (Hitachi Global Storage Technologies Docket No. JP920020171US1), filed on Oct. 25, 2002, and entitled "Disk Drive and Actuator".

BACKGROUND OF THE INVENTION

1. Technical Field

The present invention relates to a disk drive for driving, for example, a hard disk. More particularly, the present invention relates to a disk drive provided with an actuator for writing and reading data to and from a recording disk.

2. Description of the Related Art

A disk drive, such as a hard disk drive, is used prevalently as a principal data storage means for a computer. The disk drive includes a case called a disk enclosure, and one or more of recording disks for recording data. The recording disk or recording disks are supported for rotation on a spindle fixed to the case, and are driven for rotation by a spindle motor. An actuator for reading and writing data from and to the recording disk is disposed near the recording disk.

The actuator is supported for turning by a bearing on a pivot shaft fixed to the case of the disk drive. The actuator has an arm extending on one side of the pivot shaft, and a magnetic head supported on a free end part of the arm. A coil support extends on the other side of the pivot shaft, and a voice coil included in a voice coil motor (VCM) is mounted on the coil support.

A stator included in the VCM is disposed opposite to the voice coil mounted on the actuator. A magnetic field created between the stator and the VCM is varied to drive the actuator for turning on the pivot shaft. Consequently, the magnetic head mounted on the free end part of the arm of the actuator moves along the surface of the recording disk to access a desired track in the surface of the recording disk for reading or writing data from or to the recording disk.

The recording capacity of the disk drive has progressively increased in recent years, and the enhancement of speed of operations for reading and writing data from and to the recording disk has been required. Although the enhancement of data processing speed, i.e., the data read/write speed of the magnetic head, is naturally important, it is important to enhance the mechanical turning speed of the actuator in making the magnetic head access (seek) a desired track on the recording disk. Thus, it is preferable that the actuator has a small moment of inertia and an intense current is supplied to the voice coil to turn the actuator at a high speed so that the magnetic head is able to access a desired track on the surface of the recording disk quickly.

One prior art technique discloses making an actuator access a desired track on a recording medium controls the operation of the actuator in moving the actuator substantially along a radius of a recording medium by a VCM. This technique makes the actuator access a desired tack on a recording medium, but does not mention any effective technique for preventing the increase of seek time necessary for the actuator to access a desired track.

SUMMARY OF THE INVENTION

In a conventional disk drive, the higher the intensity of current supplied to the voice coil, the higher is the turning speed of the actuator. However, the design of the voice coil sets an upper limit to the current that can be supplied to the voice coil. Usually, a current on the order of 1.6 A is used for energizing the voice coil. When a current on the order of 1.6 A is supplied to the voice coil, the voice coil generates heat and the resistance of the voice coil increases. Consequently, the current supplied to the voice coil decreases as the magnetic head is moved continuously over the recording disk for a seek operation, and seek time increases. In particular, increase in seek time affects data processing time significantly in a server that operates a 3 in. diameter recording disk at 10,000 rpm or a 2.5 in. diameter recording disk at 15,000 rpm to process a large amount of data.

The present invention has been made in view of the prior art technical problems and it is therefore an object of the present invention to provide a disk drive capable of preventing the increase of seek time and of reducing data processing time. The present invention provides a disk drive including an actuator provided with a coil, and characterized by a plate disposed near the coil so as to cover part of the coil. The plate disposed near the coil so as to cover part of the coil is able to suppress the increase of the resistance due to the rise of the temperature of the coil and hence a sufficient current can be supplied to the coil. The plate serves as a heat-radiating plate. Preferably, the plate is disposed near a pivot shaft supporting the actuator. When the plate is thus disposed, the increase of the moment of inertia of the actuator can be limited to the least extent.

A plurality of the plates may be arranged. The use of the plurality of plates increases the amount of absorbed heat among that generated by the coil. Preferably, the plurality of plates is disposed on the opposite sides of the coil. The plate may be with grooves in its surface, which increases the rate of heat radiation from the plate and reduces the weight of the plate. The plate may be formed in a shape having a rectangular or wavy cross section.

A disk drive according to the present invention is characterized by a heat-radiating member disposed near a pivot shaft supporting an actuator. This construction of the disk drive suppresses the increase of the resistance due to the rise of the temperature of the coil, and limits the increase of the moment of inertia of the actuator to the least extent. The heat-radiating member may be formed integrally with the pivot shaft supporting the actuator. The heat-radiating member may adhesively bonded to the pivot shaft supporting the actuator.

An actuator according to the present invention comprises a head, a support member supported for turning on a pivot shaft, a coil, and a plate disposed near the coil so as to cover part of the coil. Thus, the increase of the resistance due to the rise of the temperature of the coil can be suppressed.

An actuator according to the present invention comprises a head, a support member supported for rotation on a pivot shaft, a coil, and a heat-radiating member disposed near the pivot shaft. Thus, the increase of the resistance due to rise of the temperature of the coil can be suppressed, and the heat-radiating member thus disposed limits the increase of the moment of inertia of the actuator to the least extent.

BRIEF DESCRIPTION OF THE DRAWINGS

FIG. 3 shows a part, including a voice coil, of the actuator, in which FIG. 3(a) is a sectional view taken on line Y–Y' in FIG. 2, and FIG. 3(b) is a sectional view taken on line Z–Z' in FIG. 2.

DETAILED DESCRIPTION OF THE INVENTION

Figure 1:
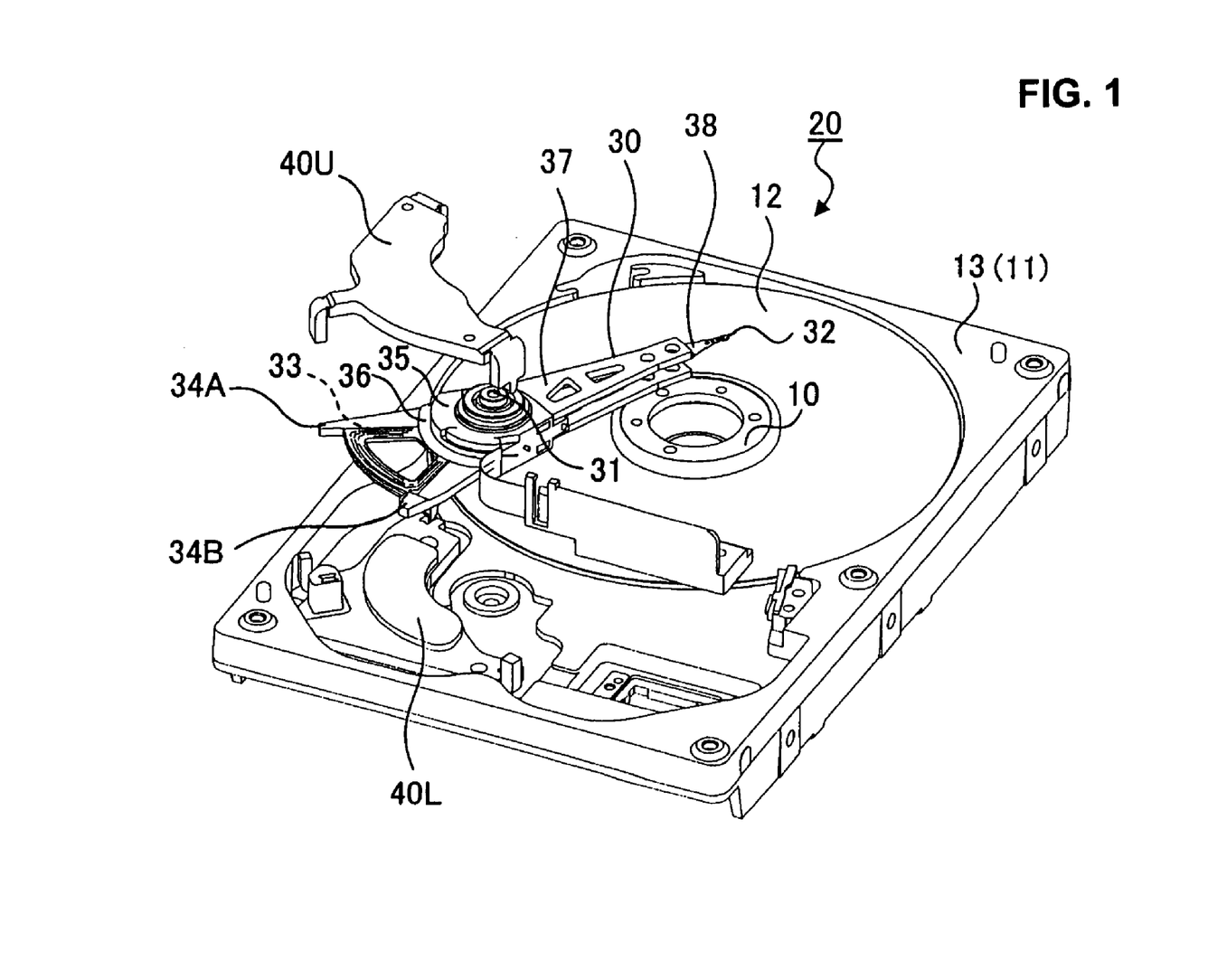
FIG. 1 is a perspective view of a hard disk device to which one embodiment of the present invention is applied.

Embodiments of the present invention are described below with reference to the accompanying drawings. FIG. 1 shows a hard disk drive (disk drive) 20 in one embodiment according to the present invention. The hard disk drive 20 is built in or externally connected to a PC (personal computer). The hard disk drive 20 operates for data reading and writing operations according to instructions given by the PC, i.e., a host device.

The hard disk drive 20 includes a predetermined number of recording disks (disk mediums, data recording mediums) 12, an actuator 30, and a disk enclosure (case) 11 holding the recording disks 12 and the actuator 30 therein. The disk enclosure 11 has a base 13 having the shape of a bottomed box having an open upper side, and a cover, not shown, closing the open upper side of the base 13.

The recording disks 12 are nonvolatile recording medium, such as magnetic disks or the like. The recording disks 12 are mounted on a spindle 10 supported on the base 13. The predetermined number of recording disks 12 are stacked in layers on the spindle 10. The spindle 10 includes integrally an in-hub type spindle motor (disk driving device), not shown. The spindle motor drives the recording disks 12 for rotation about the axis of the spindle 10 at a predetermined rotating speed.

The actuator 30 has a middle part supported on a pivot shaft 31 for turning relative to the base 13. The actuator 30 is able to turn on the pivot shaft 31 in a plane corresponding to the surface of the recording disk 12. The actuator 30 has arms 37 extending on one side of the pivot shaft 31, suspension arms 38 projecting from the free ends of the arms 37, and a pair of magnetic heads 32 supported on the suspension arms 38. The pair of magnetic heads 32 faces the upper and the lower surface, respectively, of the recording disk 12.

A pair of coil support arms 34A and 34B extend on the other side of the pivot shaft 31 in a shape substantially resembling the letter V or U. The coil support arms 34A and 34B hold a voice coil 33 consisting of a predetermined number of complete turns of wire.

An upper stator 40U and a lower stator 40L for creating a magnetic field together with the voice coil 33 are disposed so as to correspond to the voice coil 33 of the actuator 30 and are attached to the base 13. The voice coil 33 and the stators 40U and 40L constitute a VCM, i.e., a driving device for driving the actuator 30 for turning. Current supplied to the voice coil 33 is controlled to vary the magnetic field created by the voice coil 33 and the stators 40U and 40L to turn the actuator 30. The actuator 30 is thus driven by the VCM for turning on the pivot shaft 31. Consequently, the magnetic heads 32 are moved substantially along a radius of the recording disk 12 for a seek operation to positions corresponding to desired tracks on the recording disk 12, and read data recorded on the recording disk 12 or write data to the recording disk 12.

Figure 2:
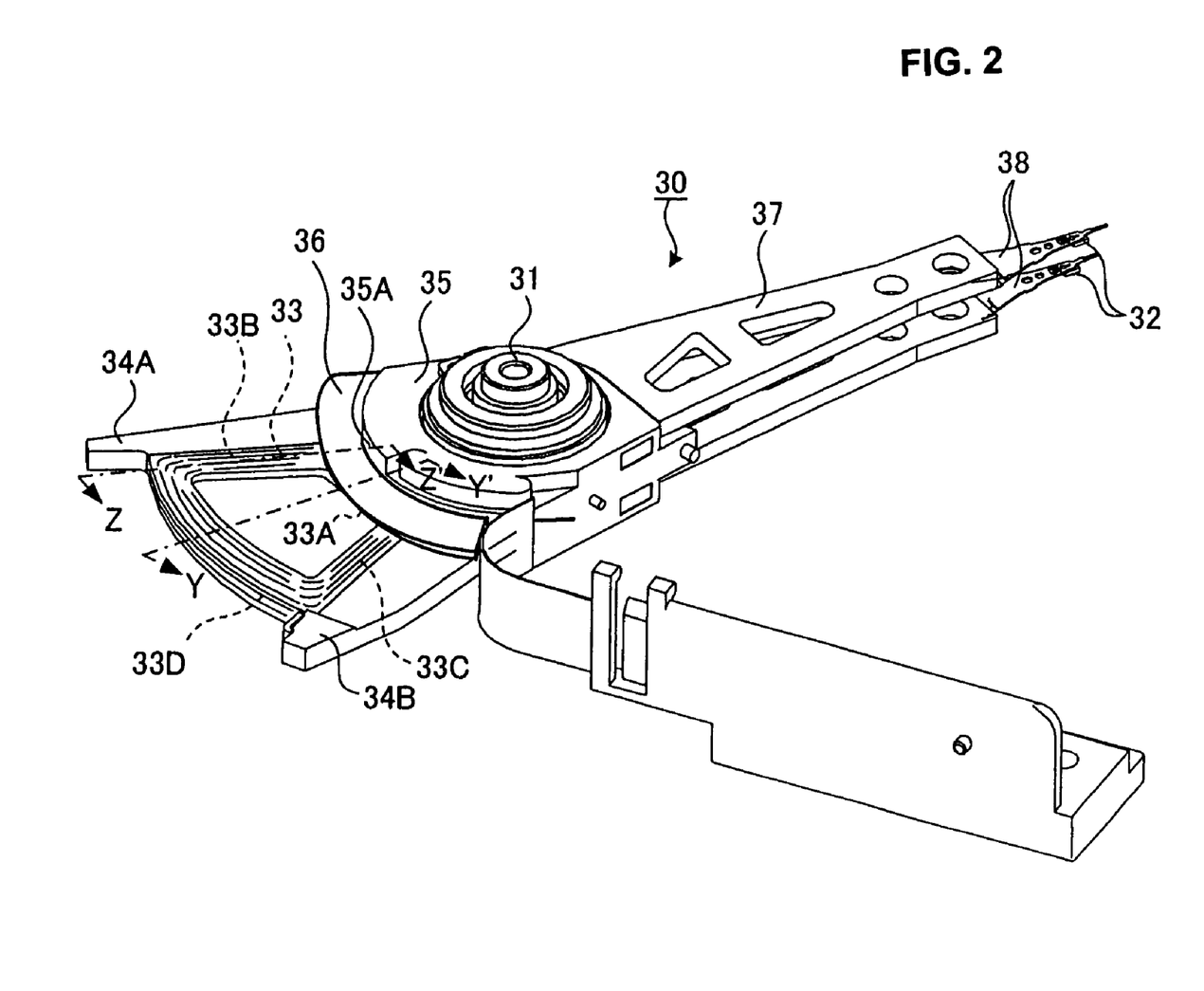
FIG. 2 is a perspective view of an actuator applied to one embodiment of the present invention.

FIG. 2 shows the actuator 30 in this embodiment. Referring to FIG. 2, the actuator 30 has plates 36 formed by processing a 0.3 mm thick aluminum flat plate. The plates 36 are placed on a side surface 35A, on the side of the voice coil 33, of a hub 35 so as to extend substantially in parallel to a plane including the voice coil 33. The plates 36 cover a part, in the vicinity of the hub 35, of a region in which the voice coil 33 is disposed.

The voice coil 33 has a substantially rectangular shape, and a plane including the voice coil 33 is perpendicular to the pivot shaft 31. The plates 36 cover one side 33A, on the side of the hub 35, of the voice coil 33 substantially entirely.

Figure 3:
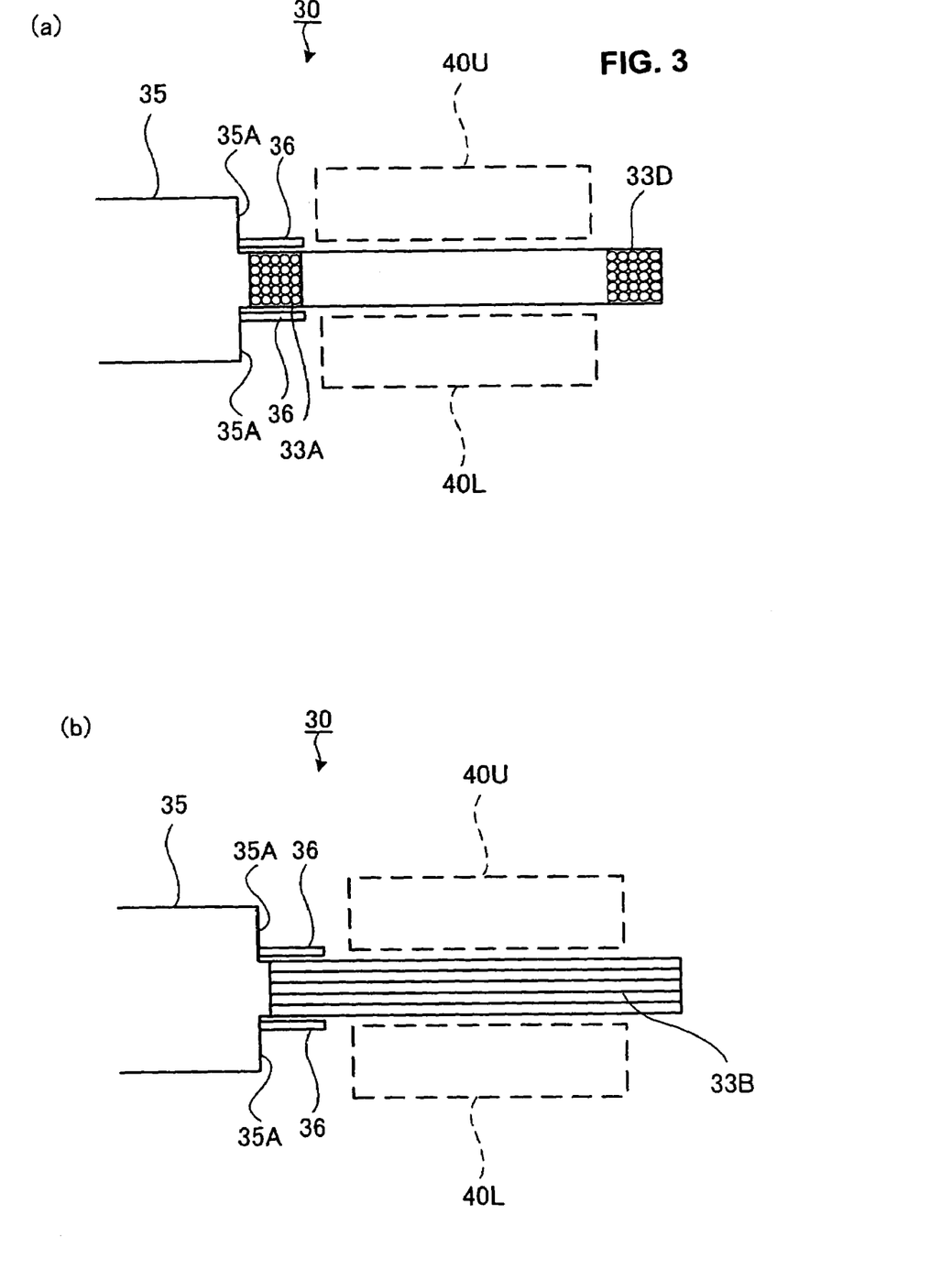

FIG. 3 includes sectional views showing a part, including the voice coil 33, of the actuator 30. FIG. 3(a) is a sectional view taken on line Y–Y' in FIG. 2, and FIG. 3(b) is a sectional view taken on line Z–Z' in FIG. 2. As shown in FIG. 3, the upper stator 40U and lower stator 40L are disposed close to the voice coil 33 on the upper and the lower side, respectively, of the voice coil 33. Two sides 33B and 33C, extending toward the pivot shaft 31, of the voice coil 33 are effective in generating a torque for turning the actuator 30. Therefore, the stators 40U and 40L extend only in a region in which the two sides 33B and 33C, extending toward the pivot shaft 31, of the voice coil 33 move as shown in FIG. 3(b), and do not extend in regions in which a side 33A, near the hub 35, of the voice coil 33 and a side 33D, remote from the hub 35, of the voice coil 33 as shown in FIG. 3(a). The plates 36 are disposed near the hub 35 in a space between the stators 40U and 40L, including the side 33A of the voice coil 33 close to a plane including the voice coil 33 with respect to a direction perpendicular to the plane including the voice coil 33. The two plates 36 are disposed on the upper and the lower side, respectively, with respect to a direction perpendicular to the plane including the voice coil 33.

When a voltage is applied to the voice coil 33, the actuator 33 turns. Consequently, the magnetic heads 32 move substantially along a radius of the recording disk 12 for a seek operation to positions corresponding to a desired tracks on the recording disk 12. A current on the order of 1.6 A flows through the voice coil 33 and the voice coil 33 generates heat owing to the agency of its resistance and the temperature of the voice coil 33 rises. Consequently, the resistance of the voice coil 33 increases, the current flowing through the voice coil 33 decreases and the magnetic heads 32 cannot moved at a desired seek speed.

In the actuator 30 in this embodiment, the plates 36 are disposed close to a plane including the voice coil 33 with respect to a direction perpendicular to the plane including the voice coil 33 so as to cover the side 33A, on the side of the hub 35, of the voice coil 33 substantially entirely. Therefore, heat generated by the side 33A, near the hub 35, of the voice coil 33 is radiated toward and absorbed by the plates 36. Thus, the temperature of the voice coil 33 decreases.

Heat generated by the voice coil 33 is transferred through the side 33A near the hub 35 to the plates 36, and the plates 36 dissipate the absorbed heat. Thus, the heat generated by the voice coil 33 can efficiently be dissipated.

The actuator 30 was moved at a seek speed of 50 iops (input output per second) for experimental operations. Whereas the voice coil 33 was heated at 45.3° C. when the plates 36 were removed, the voice coil 33 was heated at 35.7° C. when the actuator 30 was provided with the plates 36. When the actuator 30 was moved at a seek speed of 150 iops, the temperature of the voice coil 33 was 81.3° C. when the plates 36 were removed and was 69.3° C. when the actuator 30 was provided with the plates 36.

Figure 4:
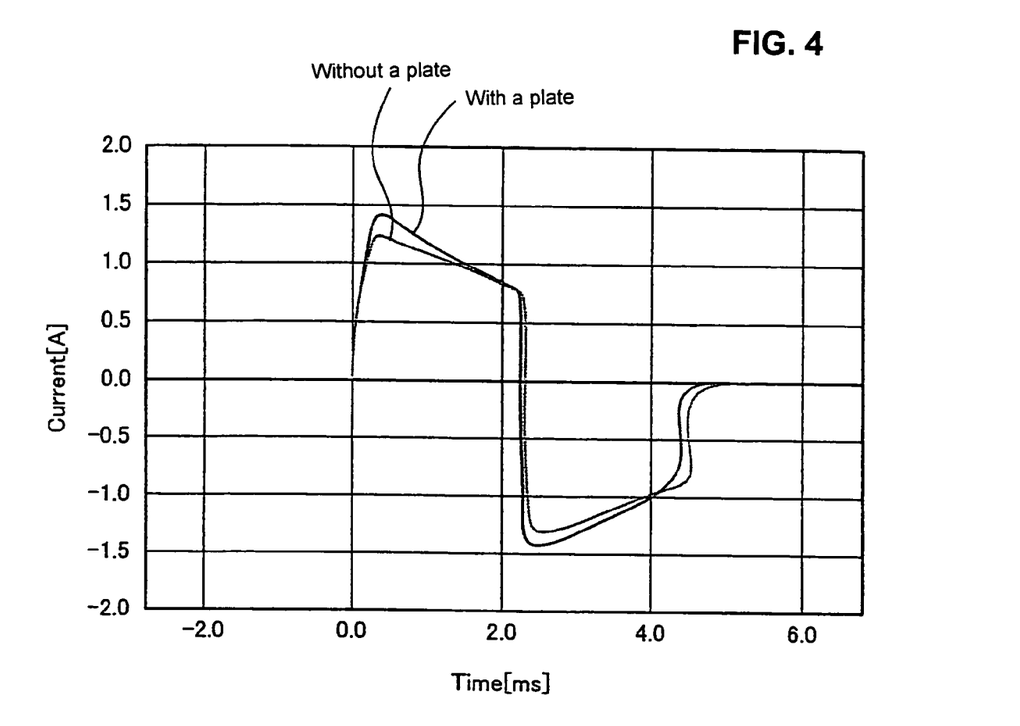
FIG. 4 is a graph comparatively showing currents that flowed through voice coils when seek speed was 50 iops.
Figure 5:
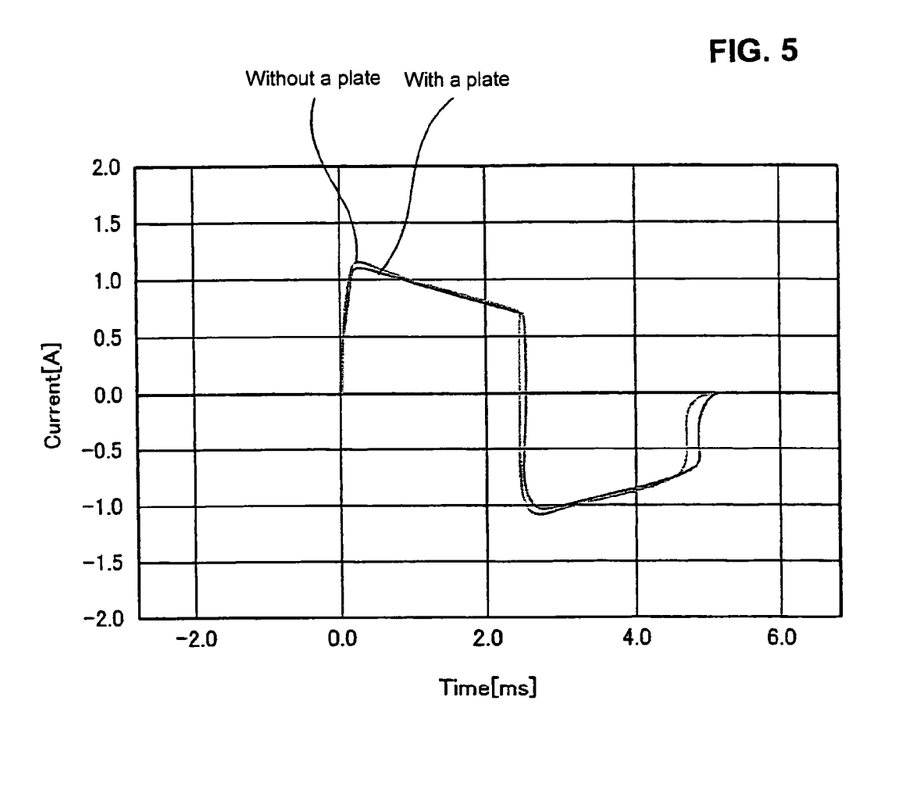
FIG. 5 is a graph comparatively showing currents that flowed through voice coils when seek speed was 150 iops.

FIGS. 4 and 5 are graphs showing the results of mean seek time simulation, in which the actuator with the plates 36 and an actuator without the plates 36 were operated at different seek speeds. FIGS. 4 and 5 show the variation of currents that flowed through the voice coils 33 with time when the actuator 30 was moved for seek operation relative to the recording disk 12 at seek speeds of 50 iops and 150 iops, respectively. In FIGS. 4 and 5, current is measured on the vertical axis and time is measured on the horizontal axis.

It is known from FIGS. 4 and 5 that the reduction of the current flowing through the voice coil 33 can be suppressed in both the case where the seek speed is 50 iops and the case where the seek speed is 150 iops. When the actuator was moved at a seek speed of 50 iops, seek time was 5.44580 ms when the plates 36 were removed, and seek time was 5.29332 ms when the actuator 30 was provided with the plates 36. Thus, the use of the plates 36 reduced seek time by 3.1%. When the actuator was moved at a speed of 150 iops, seek time was 5.788669 ms when the plates 36 were removed, and seek time was 5.67490 ms when the actuator 30 was provided with the plates 36. Thus, the use of the plates 36 reduced seek time by 2.2%.

The plates 36 are placed on the side surface 35A, on the side of the voice coil 33, of the hub 35. Since the plates 36 are placed on the hub 35 near the axis of turning of the actuator 30, the increase of the moment of inertia of the actuator 30 can be limited to the least extent. Thus, the turning performance of the actuator 30 is not deteriorated, and the effect of the plates 36 on extending the seek time can be limited to the least extent. Preferably, the plates 36 are formed of a metal having a small specific gravity, such as aluminum or a magnesium alloy.

The plates 36 are spaced 0.5 mm apart from the voice coil 33. The heat absorbing effect and heat absorbing efficiency of the plates 36 enhance when the plates 36 are disposed closer to the voice coil 33. Preferably, the plates 36 are disposed so as to come into contact with the voice coil 33.

On the other hand, the heat capacity of the plates 36 can be increased, the amount of heat generated by the voice coil 33 and absorbed by the plates 36 can be increased and the amount of heat dissipated from the plates 36 can be increased by increasing the surface area of the plates 36, and the effect of cooling the voice coil 33 can be enhanced. However, the weight of the plates 36 and the moment of inertia of the actuator increase when the surface area of the plates 36 is increased. Therefore, an optimum value must selectively be determined through the comparative consideration of the effect of the plates 36 on cooling the voice coil 33 and that of the same on increasing the moment of inertia of the actuator 30.

Figure 6:
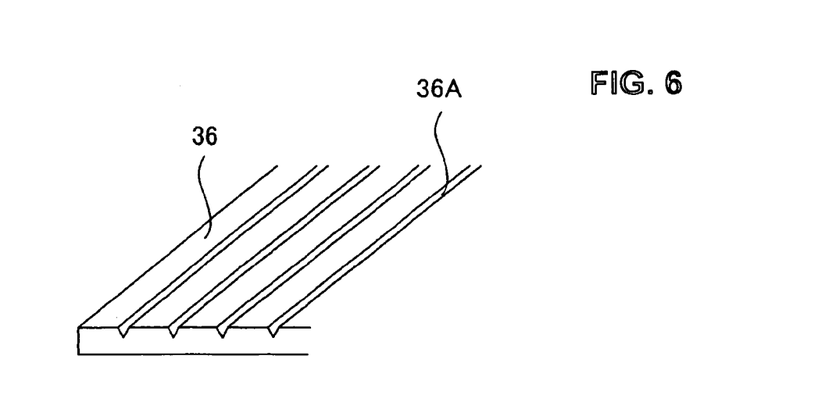
FIG. 6 is a view of assistance in explaining a surface shape of a plate.

FIG. 6 shows the shape of the surface of the plate 36. As shown in FIG. 6, the plate 36 is provided in its surface with grooves 36A. The formation of the grooves 36A in the surface of the plate 36 increases the surface area of the plate 36 and reduces the weight of the plate 36, which reduces the moment of inertia of the actuator 30. The grooves 36A may be extended in any direction. The arrangement of the grooves 36A in a high density is effective in increasing the amount of heat absorbed from the voice coil 33 and the amount of heat dissipated.

Figure 7:
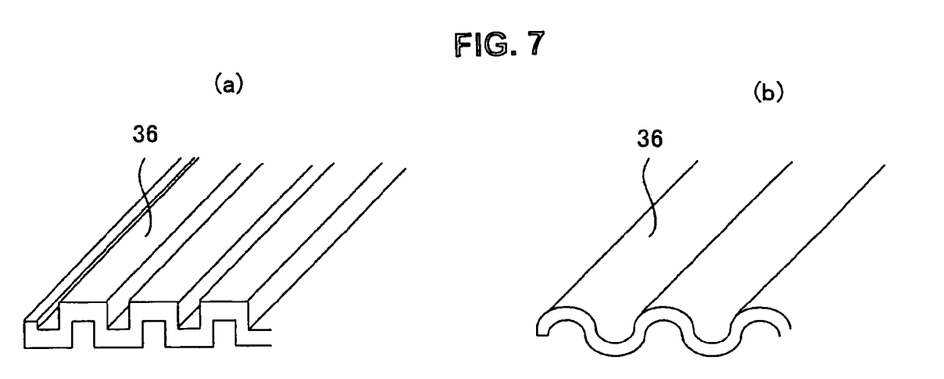
FIGS. 7(a) and 7(b) are views of assistance in explaining other surface shapes of plates.

FIG. 7 shows other possible surface shapes of the plate 36. The plate may have a rectangular cross section or a wavy cross section as shown in FIG. 7 for the same effect. The body of the actuator 30 is formed of aluminum by extrusion molding. The plates 36 are formed integrally with the body of the actuator 30. When the plates 36 are formed integrally with the body of the actuator 30, heat absorbed by the plates 36 is transferred to the body of the actuator 30 and the heat is dissipated from the body of the actuator 30, which enhances the effect of cooling the voice coil 33.

The plates 36 may be bonded to the body of the actuator 30 with an adhesive. The adhesive bonding of the plates 36 to the body of the actuator 30 improves productivity when the plates 36 have a complicated cross section, such as a rectangular cross section or a wavy cross section. It is preferable to use an adhesive having a high heat conductivity for bonding the plates 36 to the body of the actuator 30.

The embodiment of the present invention is capable of suppressing the rise of the temperature of the voice coil and of preventing the excessive increase of the resistance of the voice coil 33. Therefore, a sufficient current can be supplied to the voice coil 33 and quick data access can be achieved without increase in seek-time. The present invention is particularly effective in making a server that processes a large amount of data at a high data processing speed achieve quick data access.

As apparent from the foregoing description, according to the present invention, increase in seek time is prevented, and data processing time is reduced.

What is claimed is:

1. A disk drive, comprising:
a rotating recording disk for storing data;
an actuator supported for turning on a pivot shaft having an axis, and provided with a head capable of either reading data stored in the recording disk or writing data to the recording disk, or of both reading data from and writing data to the recording disk, and a coil having upper and lower axial surfaces disposed on one radial side of the pivot shaft opposite the other radial side of the pivot shaft on which the head is disposed;
a plurality of plates mounted to the actuator and disposed near the coil so as to cover part of the coil, such that the upper and lower axial surfaces of the coil are located axially between the plurality of plates; and wherein
the plurality of plates are disposed near the pivot shaft, and the coil has a radially inner portion, a radially outer portion, and sides that extend radially between the radially outer and inner portions, and the plurality of plates radially cover only the radially inner portion of the coil.

2. The disk drive of claim 1, wherein the plurality of plates are heat-radiating plates, the coil has side edges extending in an angular direction, and the plurality of plates have an angular width that extends beyond the side edges in the angular direction.

3. The disk drive of claim 1, wherein the plurality of plates are provided with grooves at least in one of their respective surfaces.

4. The disk drive of claim 1, wherein the plurality of plates have rectangular or wavy cross sections.

5. A disk drive, comprising:
a rotating recording disk for storing data;
an actuator supported for turning on a pivot shaft having an axis, and provided with a head capable of either reading data stored in the recording disk or writing data to the recording disk, or of both reading data from and writing data to the recording disk, and a coil having side edges extending in an angular direction disposed on one radial side of the pivot shaft opposite the other radial side of the pivot shaft on which the heads are disposed;

a heat-radiating member mounted to the actuator and disposed near the pivot shaft, the heat radiating member having an angular width that extends beyond the side edges of the coil in the angular direction; and wherein the heat-radiating member is bonded adhesively to the pivot shaft, the coil has a radially inner potion, a radially outer portion, and sides that extend radially between the radially outer and inner portions, and the heat radiating member radially covers only the radially inner portion of the coil.

6. The disk drive of claim 5, wherein the heat-radiating member is formed integrally with the pivot shaft, the heat-radiating member comprises a plurality of plates, and the coil is axially located completely between the plurality of plates.

7. An actuator, comprising:

a head capable of either reading data or writing data, or of both reading and writing data;

a support member supporting the head and being supported for turning on a pivot shaft having an axis;

a coil supported on one radial part of the support member opposite a radial part of the support member on which the head is supported with respect to the pivot shaft, the coil having a radially inner portion, a radially outer portion, sides extending between the radially inner and outer portions, and side walls extending in an angular direction; and a pair of plates mounted to the support member and disposed near the coil so as to cover only part of the coil, such that the coil is axially located completely between the pair of plates.

8. The actuator of claim 7, wherein the pair of plates are disposed near the pivot shaft and only radially cover the radially inner portion of the coil.

9. The actuator of claim 7, wherein the pair of plates each have an angular width that extends in the angular direction beyond the side walls of the coil.

10. An actuator, comprising:

a head capable of either reading data or writing data, or of both reading data and writing data;

a support member supporting the heads and being supported for turning on a pivot shaft having an axis;

a coil mounted on a radial part of the support member on the other radial side of the pivot shaft, the coil having a radially inner portion, a radially outer portion, sides extending between the radially inner and outer portions, and side wails extending in an angular direction; and a pair of heat-radiating members mounted to the support member and disposed near the pivot shaft such that the coil is axially located completely between the pair of heat-radiating members, only the radially inner portion of the coil is radially covered by the heat-radiating members, and each of the heat-radiating members has an angular width that extends in the angular direction beyond the side walls of the coil.

11. The actuator of claim 10, wherein the heat-radiating members are formed integrally with the pivot shaft.

12. The actuator of claim 10, wherein the heat-radiating members are bonded adhesively to the pivot shaft.

* * * * *